(12) United States Patent
Barnes et al.

(10) Patent No.: US 11,186,035 B2
(45) Date of Patent: Nov. 30, 2021

(54) FORMING THREE-DIMENSIONAL (3D) PARTS

(71) Applicant: HEWLETT-PACKARD DEVELOPMENT COMPANY, L.P., Houston, TX (US)

(72) Inventors: Arthur H. Barnes, Vancouver, WA (US); Wesley R. Schalk, Vancouver, WA (US); Matthew A. Shepherd, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 648 days.

(21) Appl. No.: 16/076,543

(22) PCT Filed: Jul. 29, 2017

(86) PCT No.: PCT/US2017/044559
§ 371 (c)(1),
(2) Date: Aug. 8, 2018

(87) PCT Pub. No.: WO2019/027405
PCT Pub. Date: Feb. 7, 2019

(65) Prior Publication Data
US 2021/0178667 A1    Jun. 17, 2021

(51) Int. Cl.
*B29C 64/165*    (2017.01)
*B33Y 10/00*    (2015.01)
*B33Y 30/00*    (2015.01)
*B29C 64/295*    (2017.01)

(52) U.S. Cl.
CPC .......... *B29C 64/165* (2017.08); *B29C 64/295* (2017.08); *B33Y 10/00* (2014.12); *B33Y 30/00* (2014.12)

(58) Field of Classification Search
CPC .... B29C 64/165; B29C 64/236; B29C 64/295
See application file for complete search history.

(56) References Cited

U.S. PATENT DOCUMENTS

| | | | |
|---|---|---|---|
| 6,245,281 | B1 | 6/2001 | Scholten et al. |
| 8,119,053 | B1 | 2/2012 | Bedal et al. |
| 2016/0121399 | A1 | 5/2016 | Buller et al. |

(Continued)

FOREIGN PATENT DOCUMENTS

| | | |
|---|---|---|
| WO | 2008075450 A1 | 6/2008 |
| WO | 2014138386 A1 | 9/2014 |

(Continued)

OTHER PUBLICATIONS

"A Focus on SLM and SLS Methods in 3d Printing", Retrieved from Internet: https://books.google.co.in/books?id=tMndCgAAQBAJ&pg=PA99&lpg=PA99&dq=#v=onepage&q&f=false, 2015, 2 pages.

*Primary Examiner* — Mary Lynn F Theisen
(74) *Attorney, Agent, or Firm* — Dierker & Kavanaugh PC (57) ABSTRACT

In an example implementation, a method of forming a three-dimensional (3D) part includes spreading a layer of build material over a print bed, and heating the layer of build material during each of multiple consecutive carriage passes over the print bed to maintain printed portions of the build material above a melting temperature for the duration of the consecutive carriage passes.

15 Claims, 10 Drawing Sheets

(56) References Cited

U.S. PATENT DOCUMENTS

2016/0318251 A1* 11/2016 Ederer .................. B29C 64/165
2017/0090462 A1    3/2017 Dave et al.
2017/0355137 A1* 12/2017 Ederer .................. B29C 64/165

FOREIGN PATENT DOCUMENTS

| WO |    2016012002  A1   |  1/2016 |     |            |
|----|---------------------|---------|-----|------------|
| WO |    2016080993  A1   |  5/2016 |     |            |
| WO | WO-2016101942  A1 * |  6/2016 | ... | B29C 64/165|
| WO |    2016175817  A1   | 11/2016 |     |            |
| WO |    2017003484  A1   |  1/2017 |     |            |
| WO |    2017023281  A1   |  2/2017 |     |            |
| WO | WO-2017069752  A1   |  4/2017 |     |            |

* cited by examiner

FORMING THREE-DIMENSIONAL (3D) PARTS

BACKGROUND

Three-dimensional (3D) printers can produce 3D parts by providing a layer-by-layer accumulation and solidification of build material patterned from digital models. In some examples, inkjet type printheads can print (i.e., deliver) a liquid or binder material onto layers of powdered build material in predetermined areas of each layer. In some examples, liquid binder can penetrate and react with the build material layers, causing the layers to solidify in the printed areas. In some examples, the liquid comprises a fusing agent that can absorb energy to heat the printed areas and cause the printed areas of each layer to fuse together.

BRIEF DESCRIPTION OF THE DRAWINGS

Examples will now be described with reference to the accompanying drawings, in which.

Throughout the drawings, identical reference numbers designate similar, but not necessarily identical, elements.

DETAILED DESCRIPTION

In some examples of 3D printing, parts can be formed from digital models through a layer-by-layer accumulation and solidification of powdered build material. The solidification of the build material can be achieved by heating the material until the powdered particles melt together. Current methods of heating powdered material such as SLS (selective laser sintering), for example, can work well to melt and bond together the powdered material within each layer. However, melting the powdered material in a manner sufficient to create strong bonds between adjacent layers of build material is more challenging. Some methods of heating the powdered material may not provide sufficient melting time to enable robust bonding between adjacent layers of build material, and/or such methods may cause undesirable results in some powdered material such as powder caking, as discussed below.

In some examples of 3D printing, stationary heating lamps are positioned over a build area to continually apply heat to layers of powdered material spread over a build platform. The continual application of heat from static heating lamps helps keep the powder layer temperatures from dropping too low in between printing operations. For example, following the melting or fusing of a powder layer, the temperature of the layer can drop quickly as a next layer of powder is spread over the build platform and printed on with a liquid agent. The fast drop in temperature can cause curling of the melted layer and warping of the part. Overhead, static heating lamps can help prevent such fast drops in temperature.

The continual application of heat from static heating lamps additionally helps maintain the powder material at appropriate temperatures that keep the powder near its melting point. Maintaining the powder material at higher temperatures enables the temperature in selected areas of the powder to be more easily increased beyond the melting point when forming the parts. Temperature increases that cause melting of selected areas of powdered material can be achieved, for example, by the application of laser energy or by the application of additional heat from another heating lamp traveling across the build platform.

In general, the application of heat from static heating lamps is indiscriminate, as it affects the whole layer of powder on the build platform. That is, heat from overhead static lamps affects the selected areas of powder to be melted and solidified into the 3D part, as well as affecting the surrounding areas of powder that will not be melted into the part. One drawback with using static heating lamps to maintain the powder temperatures in this way, is that it can result in the partial fusing of those powder areas that surround the 3D part. When static heating lamps are used to maintain the temperature of powdered build material near its melting point (which is common in SLS processes), the powder material surrounding the part may begin to fuse together into a block or cake of hardened powder. When formation of the parts is complete, removing the parts from the cake of hardened powder can be labor intensive and costly. In addition, the hardened chunks of partly fused powder are more difficult to break apart into fine powder that can be extracted for recycling. Moreover, recycled powder that has been partly fused in this manner has a diminished quality compared to previously unused powder. The diminished quality of the recycled powder may reduce the ratio of recycled powder to new powder that can be used to make parts of satisfactory quality which may increase the cost of making such parts.

Accordingly, example methods of forming 3D parts described herein provide improved control over the energy being applied to powder layers through a multistep process that allows for the elimination of static overhead heating lamps. The multistep process provides improved energy control that helps maintain melting temperatures for longer durations within the selected areas of powder being melted to form the 3D parts. Maintaining the parts above the melting temperature for longer durations improves polymer chain entanglement and reptation, which creates stronger bonds between adjacent layers of build material and improves the overall material properties of the parts.

The multistep process additionally enables maintaining the powder surrounding the 3D parts at lower temperatures during formation of the 3D parts. Maintaining powder layers at lower temperatures helps to prevent partial fusing and caking of the powder surrounding the parts. Thus, powder that surrounds the 3D parts is in a better condition for recycling and can be more easily extracted, for example, through holes in the build platform. The improved quality of the extracted powder helps to reduce costs by enabling a higher ratio of used powder to new powder when mixing powder for recycling.

A multistep process is performed to complete each layer of a part. Each process step includes passing a carriage over the print platform to perform multiple operations. The operations can include spreading powder over the print platform, warming the powder with a scanning warming lamp, selectively printing liquid agents onto the powder, and fusing the powder with a scanning fusing lamp in areas where liquid agents have been printed on the powder. Performing multiple operations with each pass of a carriage over the print platform enables faster carriage movement and reduces the time for completing each layer of the part.

The reduced time between each pass of the carriage over the print platform reduces the time between applications of heat for warming and fusing the powder, which mitigates sharp temperature drops between heat lamp exposures. This also helps reduce the time it takes to generate 3D printed objects.

In a particular example, a method of forming a 3D part includes spreading a layer of build material over a print bed, and heating the layer of build material with scanning warming and fusing lamps on a carriage during each of consecutive carriage passes over the print bed to maintain printed portions of the build material above a melting temperature for the duration of the consecutive carriage passes.

In another example, a method of forming a 3D part can include passing a first carriage comprising a spreader over a print bed one or multiple times to spread a new layer of build material over the print bed, and passing a second carriage comprising a liquid dispenser over the print bed one or multiple times to selectively print a liquid agent onto the build material. While the first carriage is being passed over the print bed multiple times, fusing energy and warming energy from scanning lamps on the first carriage are applied from the first carriage with each pass to continually maintain the printed build material above a melting temperature while continually maintaining unprinted build material within a neutral temperature zone, below a caking onset temperature and above a crystallization onset temperature.

In another example, a method of forming a 3D part includes, in a first pass, passing a first carriage comprising fusing and warming lamps and a spreader over a print bed to fuse and warm a previous layer of build material and to spread a pile of build material to form a new layer of build material over the previous layer of build material. In a second pass, the first carriage and a second carriage comprising a liquid dispenser are passed over the print bed in-line with one another to spread a remainder of the pile of build material over the new layer, warm the new layer, and print a liquid fusing agent onto the new layer. In a third pass, the first and second carriages are passed over the print bed in-line with one another to print a liquid agent onto the new layer, fuse the printed areas of the new layer, and warm the new layer. In a fourth pass, the first carriage is passed over the print bed to warm the new layer and to fuse the printed areas of the new layer.

FIGS. 1-5 show a simplified block diagram of an example three-dimensional (30) part forming device 100, implemented as a 3D printer 100. The example 3D printer 100 shown in FIGS. 1-5 is generally capable of forming, generating, or printing 3D parts according to some example methods described herein. In general, FIGS. 1-5 together, help illustrate a process for forming each layer of a 3D part that includes passing first and second bi-directional carriages multiple times over a print bed to perform multiple functions in a particular sequence during each carriage pass. The multistep process is discussed in greater detail below with respect to FIGS. 1-5.

Figure 1A:
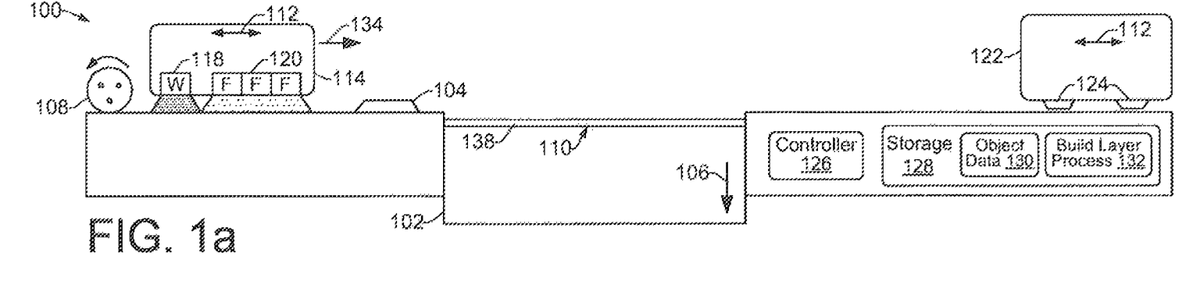
FIGS. 1-5 show a simplified block diagram of an example three-dimensional (3D) part forming device, implemented as a 3D printer.
Figure 1B:
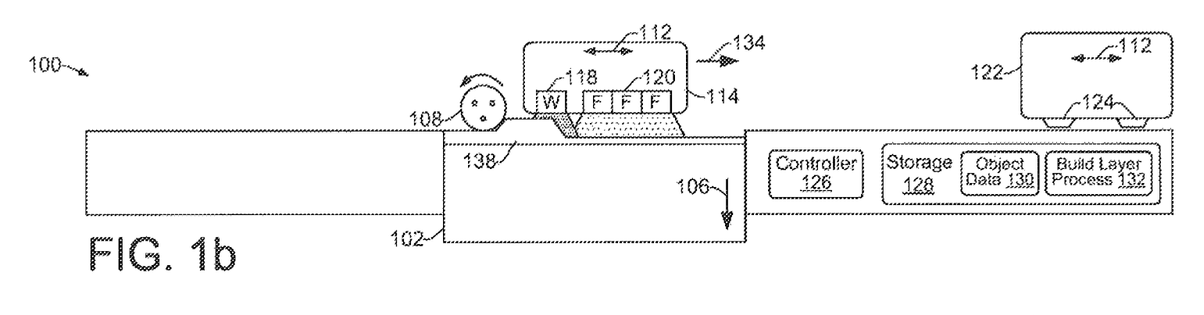
Figure 1C:
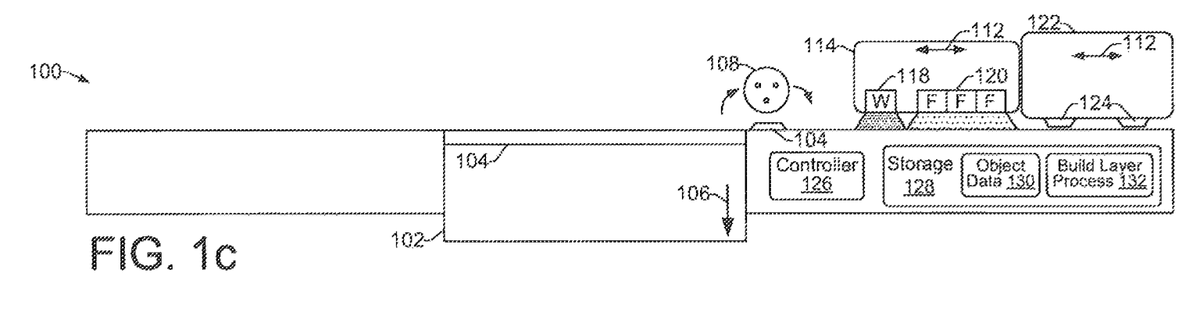

Referring to FIG. 1 (shown as FIGS. 1*a*, 1*b*, and 1*c*), some components of an example 3D printer 100 will be described. Such components and related description apply similarly to the example 3D printers 100 shown in FIGS. 2-5, especially where identical reference numbers are shown to designate similar, but not necessarily identical, elements. While some components of an example 3D printer 100 are depicted in FIGS. 1-5 and described herein, the printer 100 may include additional components that are not shown or that have been removed and/or modified. The absence of such other components is not intended to indicate a departure from the scope of the 3D printer 100 described herein.

Figure 6:
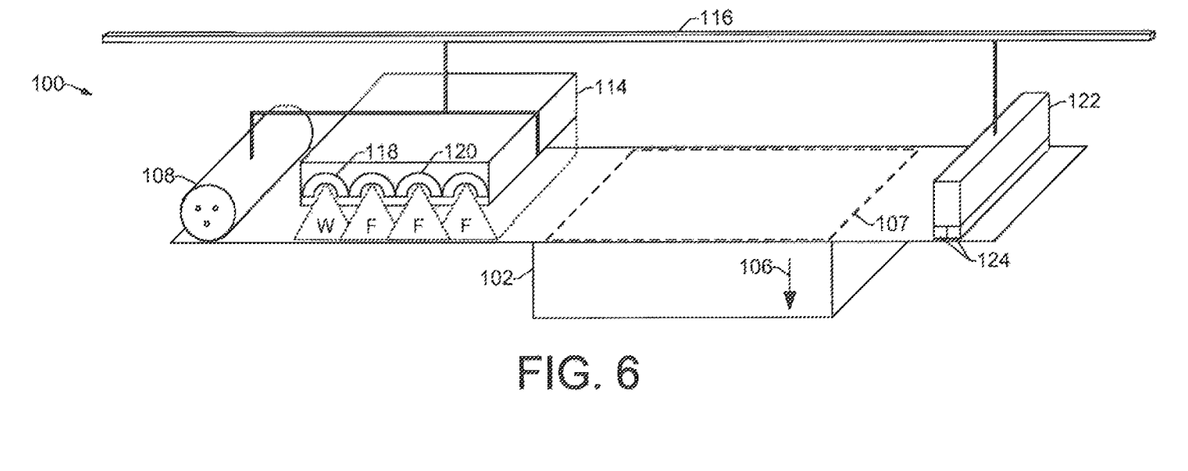
FIG. 6 shows a perspective view of an example 3D printer.

As shown in FIG. 1, an example 3D printer 100 can include a print bed 102 on which 3D objects or parts are to be formed from a build material 104. The print bed 102 can alternately be referred to as a print platform, a build platform, and the like. The print bed 102 is mobile in a vertical direction (i.e., z-axis direction) as indicated by direction arrow 106. Parts can be formed in a layer-by-layer additive process within a three-dimensional space, or build area, that develops above the print bed 102 as the print bed 102 moves vertically downward during the additive process. In this respect, in some examples the print bed 102 can comprise part of a build unit that forms a build chamber in which 3D objects are generated. In some examples, a build unit can be removable from the 3D printer 100. FIG. 6 shows a perspective view of an example 3D printer 100 that helps to illustrate how a 3D build area can develop on the print bed 102 in an area above the dashed line 107 as the bed 102 moves vertically downward.

In one example, build material 104 can be contained in a cartridge, hopper or other build material source (not shown) and can be delivered or deposited in a position next to the print bed 102 as a small pile of build material 104. The build material 104 can be spread or applied onto the print bed 102 or onto a previously formed build material layer by a spreader 108 to form a new build material layer 110. The build material 104 can comprise a variety of different types of powdered, or powder-like, materials. In one example the build material 104 comprises powdered thermoplastic Nylon 12 (i.e., polyamide 12 (PA12)). Other examples of suitable build materials include polyethylene, polyethylene terephthalate (PET), other polyamides, polystyrene, polyacetals, polypropylene, polycarbonate, polyester, polyurethanes, other engineering plastics, amorphous variations of these materials and blends of the polymers listed herein. In some examples, powdered metals and ceramics may be used. In different examples, the build material 104 may have a melting point ranging from about 55° C. to about 450° C. In a specific example, PA12 begins melting at about 180° C. and has a full melting point of about 187° C., as discussed in greater detail herein below with regard to the temperature profile graph of FIG. 7.

In some examples, the spreader 108 comprises a bi-directional spreader 108 to spread the build material 104 bi-directionally across the print bed 102 in directions indicated by the direction arrow 112. The spreader 108 may comprise a counter rotating roller as shown in FIG. 1, a blade, or another device suitable for spreading the build material 104 over the print bed 102. As shown in FIG. 6, the spreader 108 can be mounted on or be operationally coupled to a first carriage 114. The first carriage 114 can be movably supported on a rail 116 (FIG. 6) to make one or multiple passes across the print bed 102 as the spreader 108 spreads build material 104 onto the print bed 102. In some examples, the pile of build material 104 can be on the order of several millimeters tall and comprise a volume sufficient to cover the print bed 102 with a build material layer 110 having a thickness on the order of 80 microns.

As shown in FIG. 1, a first carriage 114 can include bi-directional scanning heat sources 118, 120. The scanning heat sources can include a warming source (W) 118 and a fusing source (F) 120. Both scanning heat sources can comprise heat lamps such as halogen heat lamps, for example. A scanning warming heat source 118 can comprise, for example, a halogen lamp in the mid-IR (infrared) range (1.5-4.0 micron wavelength), while a scanning fusing heat source 120 can comprise a halogen lamp in the near-IR range (0.76-1.5 micron wavelength). A warming lamp heat source 118 has a wavelength aimed to generally warm non-printed powder, whereas a fusing lamp heat source 120 has a wavelength that is designed to be better absorbed by the fusing agent(s) used in the system. The scanning warming heat source 118 and scanning fusing heat source 120 may be alternately referred to herein as a scanning warming lamp 118 or warming lamp 118, and a scanning fusing lamp 120 or fusing lamp 120, respectively, or simply as heat lamps 118 and 120. In some examples, a warming lamp 118 can comprise a halogen lamp with a color temperature at or about 1800 Kelvin, while a fusing lamp 120 can comprise a halogen lamp with a color temperature at or about 2700 Kelvin. Although one warming lamp (W) 118 and three fusing lamps (F) 120 are shown on the first carriage 114, other numbers and/or arrangements of warming and fusing lamps are also possible and contemplated.

During processing of a layer of build material 104 on the print bed 102, both heat lamps 118 and 120 can simultaneously apply energy onto the build material 104. Energy can be applied by either or both heat lamps 118 and 120 as the first carriage 114 passes over the build material 104 in either or both directions as indicated by direction arrow 112. In some examples, the amount of energy applied to the layer of build material 104 can be controlled by controlling the speed of the first carriage 114 as it passes over the print bed 102. In some examples, the amount of energy applied to the layer of build material 104 can be controlled by controlling the intensity and/or the wavelength of the light emitted from either or both of the heat lamps 118 and 120. In some examples, energy can be applied to the layer of build material 104 in a number of successive passes of the first carriage 114 over the print bed 102 in order to maintain selective portions of the build material 104 above a melting temperature while maintaining other portions of the build material 104 below the melting temperature. In some examples, different carriage speeds, different heat lamp energy intensities and wavelengths, and/or different numbers of carriage passes can be used to maintain build material 104 temperatures depending on the type of build material 104 being used in a layer 110.

As shown in FIG. 1, a second carriage 122 can include a bi-directional liquid agent dispenser 124 to print or otherwise apply a liquid agent onto selective portions of a build material layer 110. In some examples, the dispenser 124 comprises one or multiple inkjet printheads 124. The printhead 124 can include a plurality of nozzles (not shown) that extend across the width of the print bed 102 (FIG. 6) to eject a liquid, such as ink, water, or other liquid agent onto the build material layer 110. The liquid agent can comprise a fusing agent that acts as an energy absorber to facilitate heating of the build material when exposed to a scanning fusing lamp 120, for example. The printhead 124 can be implemented, for example, as a thermal inkjet printhead or a piezoelectric printhead. While the second carriage 122 is shown herein with a particular number of printheads 124 (e.g., two printheads 124), in other examples, fewer printheads 124 or additional printheads 124 can be arranged in any suitable number, such as in an array of printheads to deposit one or a number of different types of fluids.

As shown in FIG. 1, an example 3D printer 100 can include a controller 126. The controller 126 can control various operations of the 3D printer 100 to facilitate forming 3D parts in a multistep process as described herein. Controller 126 comprises a computing device that may be implemented, for example, as a semiconductor-based microprocessor, an application specific integrated circuit (ASIC), and/or another hardware device that is to control operations of various components in the 3D printer 100. Controller 126 can control, for example, the independent movement of the first carriage 114 and second carriage 122 via carriage drive systems (not shown), as well as the operation of components being transported by the carriages. Including the spreader 108, the warming and fusing lamps 118 and 120, and the liquid agent dispensing printhead(s) 124.

The controller 126 can control components and operations of the 3D printer 100 according to data and instructions stored in a storage 128, or memory 128. Storage 128 can include both volatile (i.e., RAM) and nonvolatile memory components (e.g., ROM, hard disk, optical disc, CD-ROM, magnetic tape, flash memory, etc.). Components of a storage 128 can comprise non-transitory, machine-readable (e.g., computer/processor-readable) media that can provide for the storage of machine-readable coded program instructions, data structures, program instruction modules, JDF (job definition format), 3MF formatted data, and other data and/or instructions executable by a controller 126 of the 3D printer 100.

As shown in FIG. 1, the storage 128 may store data in the form of object data 130, and executable instructions as a build layer processing module 132. In some examples, controller 126 can receive object data 130 from a host system such as a computer. Object data 130 can represent, for example, object files defining 3D object models to be produced in the 3D printer 100. Object data 130 can include build material-type definitions and related information such as melting temperature ranges for different build material types. Executing instructions from the build layer processing module 132, the controller 126 can generate print data for each cross-sectional slice of a 3D object model from the object data 130. The print data can define, for example, each cross-sectional slice of a 3D object model, the liquid agents to be used to cover the build powder within each cross-sectional slice, and how fusing and warming energy is to be applied to each layer of powder build material 104 to maintain the build material 104 at different temperatures according to the type of build material 104 being used within a build layer 110. This can include, for example, the speed of the carriage 114, the energy intensity and wavelengths for the warming 118 and fusing 120 lamps on the carriage 114, and the number of carriage passes to make over the print bed 102 to maintain appropriate temperatures in the build material 104.

In general, controller 126 can execute instructions from the layer processing module 132 according to data within the object data 130 to cause the 3D printer 100 to perform operations of a multistep process for forming each layer of a 3D part on the print bed 102. Such operations can include, for example, the operations illustrated in FIGS. 1-5 and discussed below, and the operations shown in methods 800, 900 and 1000, also described below with respect to FIGS. 8-10.

Figure 7:
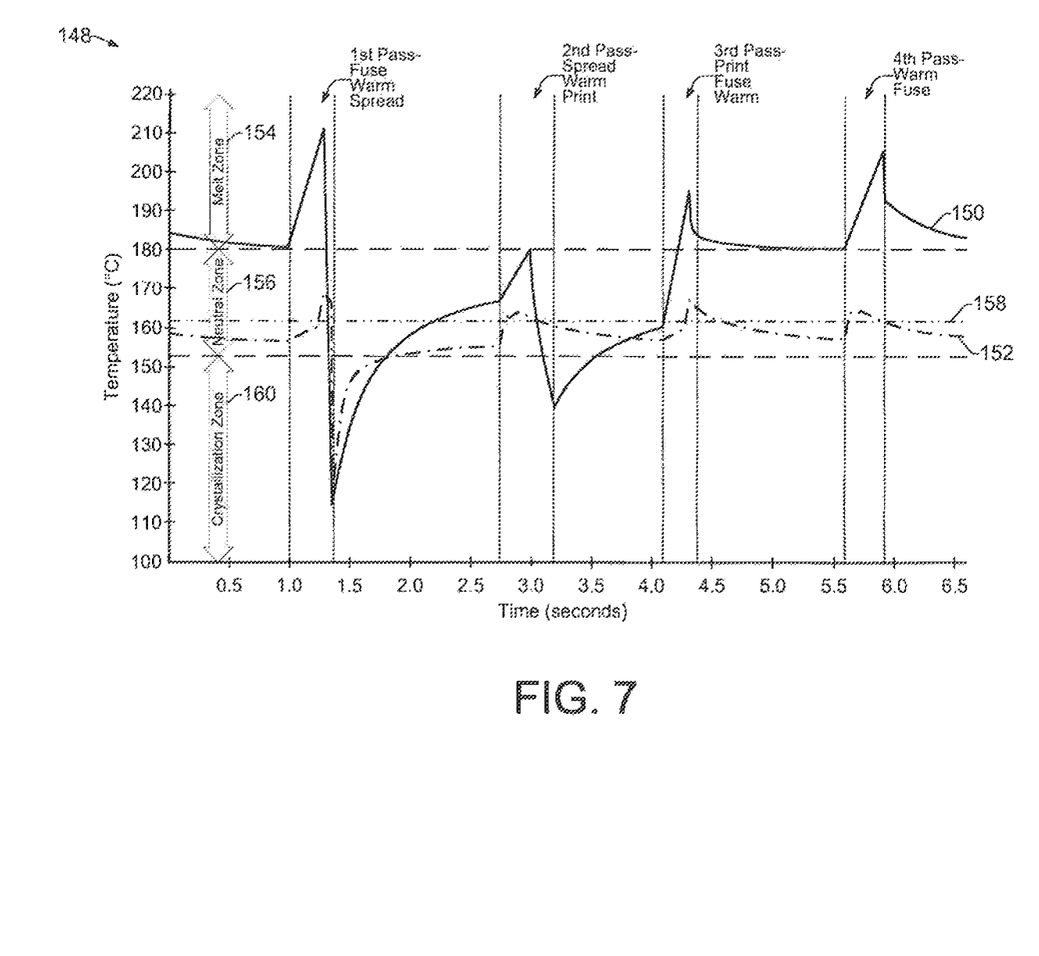
FIG. 7 shows a graph of an example temperature profile for a layer of an example build material.
Figure 8:
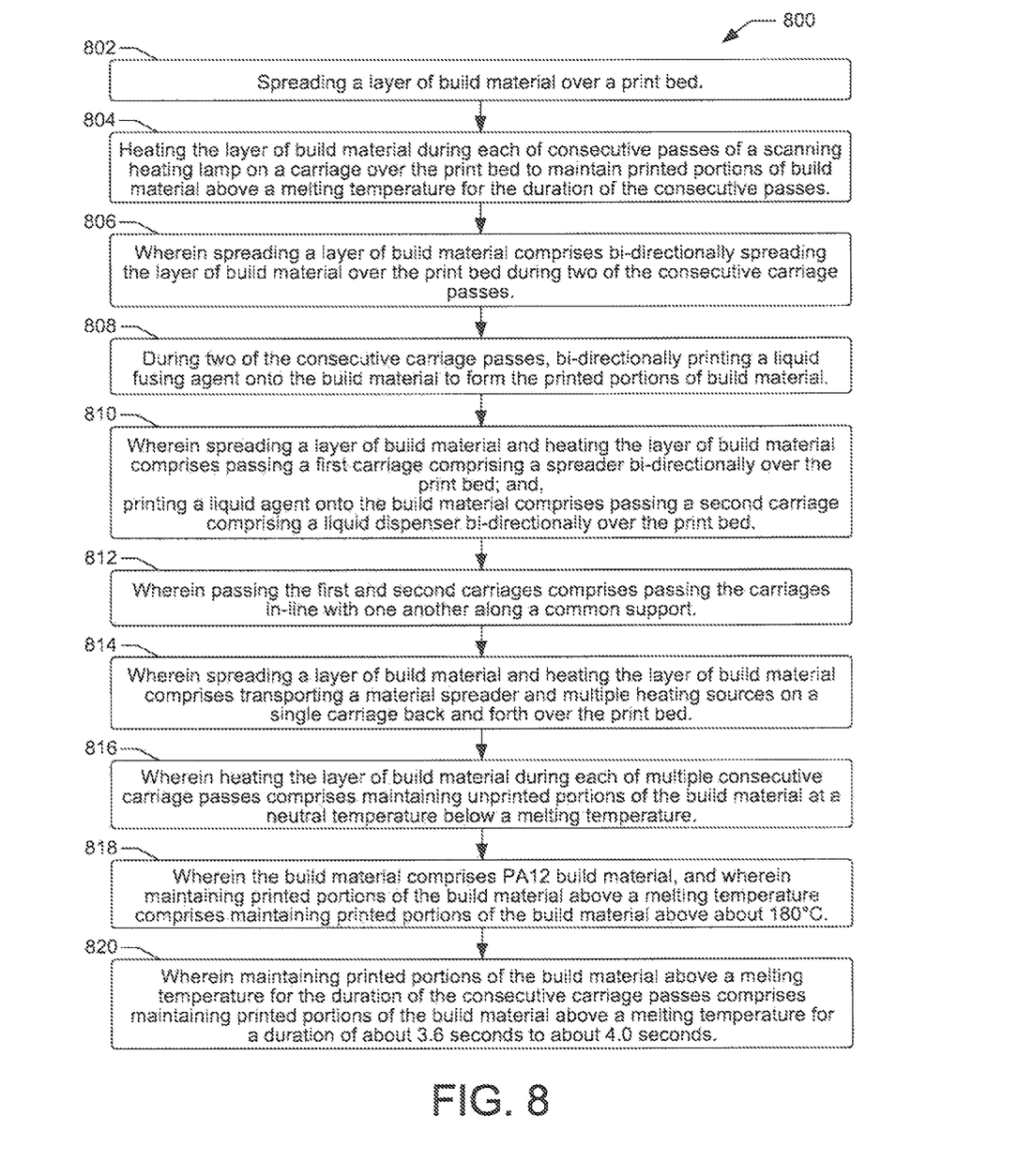
FIGS. 8, 9, and 10 are flow diagrams showing example methods of forming a three-dimensional (3D) part.
Figure 9:
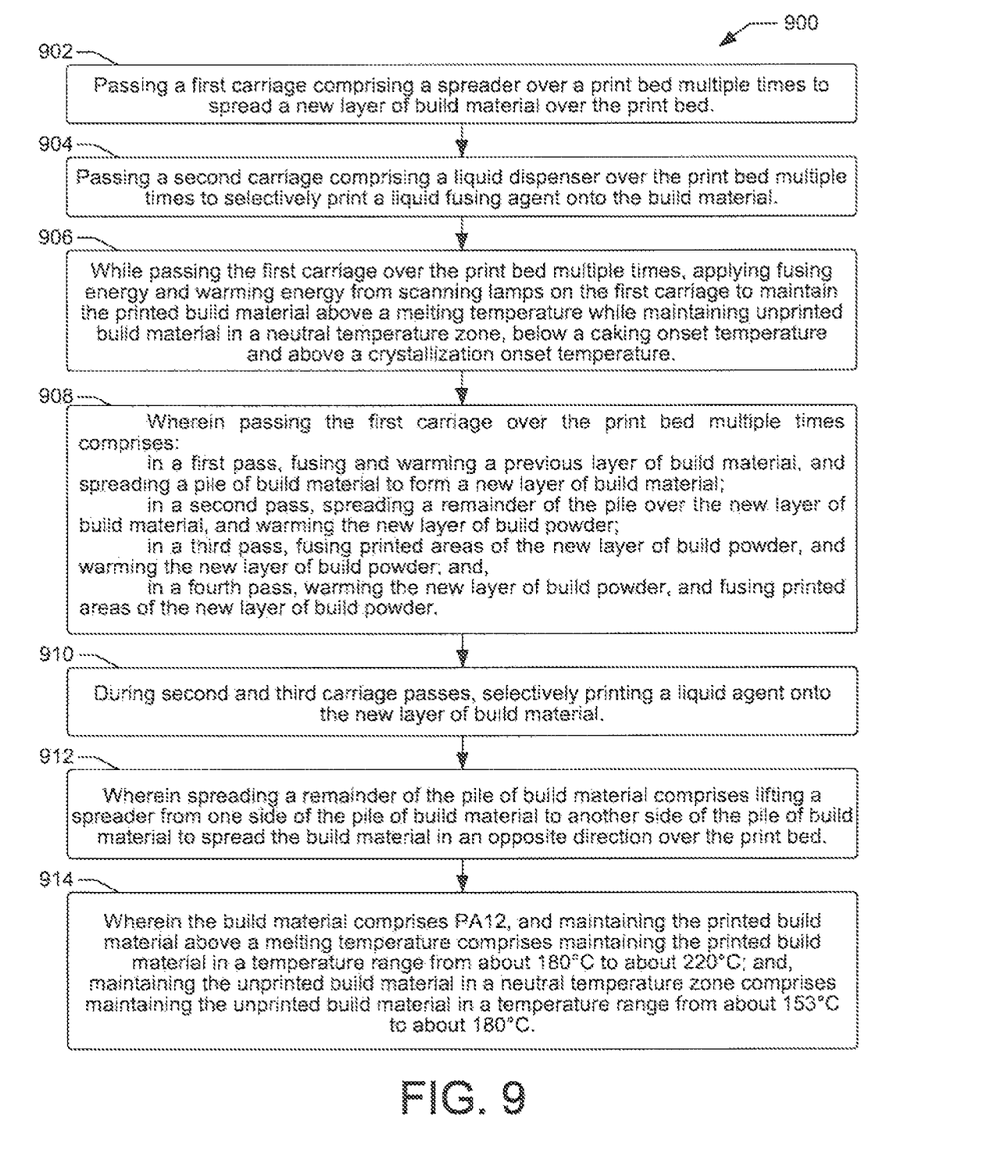
Figure 10:
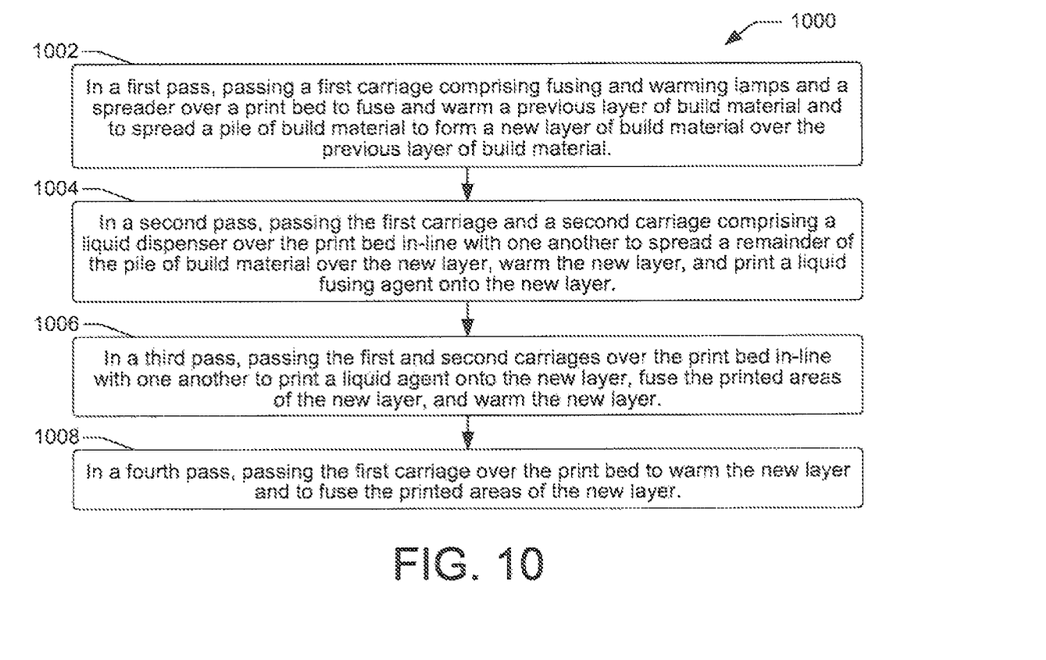

Referring generally to FIGS. 1-5, an example multistep process for forming each layer of a 3D part using PA12 build material will now be described. FIGS. 8-10 show flow diagrams whose operations generally correspond with the processes illustrated in FIGS. 1-5. In addition, the example multistep process will be described with further reference to the temperature profile graph shown in FIG. 7. FIG. 7 shows a graph of a target temperature profile versus time for a layer of build material, including the portion of build material to be fused as a 3D part (i.e., the part) and for the portion of build material that surrounds the part but is not to be fused (i.e., the powder). In the FIG. 7 example, the temperature profile illustrated is for PA12 build material. The PA 12 material used can have a very fine grain, with particle sizes on the order of 60 μm, resulting in parts with higher density and lower porosity than parts produced in other methods such as laser sintering. The temperature zones shown in FIG. 7 illustrate particular temperature ranges in which the PA12 build material 104 can melt, remain neutral, or crystallize, and these temperature ranges depend on the type of build material 104 used when forming a 3D part. While a particular example of a multistep process associated with a particular type of build material (i.e., PA12) is described herein with regard to FIGS. 1-10, other multistep processes associated with other types of build material are possible and contemplated herein.

Prior to the first process step in which the first carriage 114 passes over the print bed 102, a small pile of PA12 build material 104 is delivered next to the print platform 102. The powdered build material 104 can be delivered from a storage location such as a hopper, a material cartridge, or other build material source (not shown) to a position to be spread onto the print bed 102 or onto a previously formed layer of build material on the print bed 102.

Referring now to FIGS. 1-5, an example of a multistep process is illustrated in which multiple carriages are shown being passed over the print bed 102 of a 3D printer 100 as a layer of PA12 build material is processed during the formation of a 3D part. The example multistep process comprises a four step process implemented to complete each layer of build material in a 3D part. Each step of the process comprises passing at least one carriage over the print bed 102 to perform multiple operations from the at least one carriage. Because the multistep process is cyclical, the designation of any one step as being the first step in the process is arbitrary. Therefore, while the steps are designated herein as being first, second, third, and fourth steps, the steps could be designated in other ways as long as the sequence of the four steps remains in the same order.

Accordingly, a first step in the multistep process can begin as shown in FIG. 1a. As shown in FIG. 1a, the warming 118 and fusing 120 lamps on the first carriage 114 begin on one side (i.e., the left side) of the print bed 102 and begin moving in a first direction (i.e., from left to right) over the print bed 102 as indicated by direction arrow 134. Also coupled to, or part of, the first carriage 114, is a spreader roller 108 which also moves with the carriage 114 in the first direction. As shown in FIG. 6, the first carriage 114 can be movably supported on a rail 116 to make multiple passes across the print bed 102 as the warming lamp 118 and fusing 120 lamps apply heat to the build material and the spreader 108 spreads the build material 104 into layers on the print bed 102.

Figure 5A:
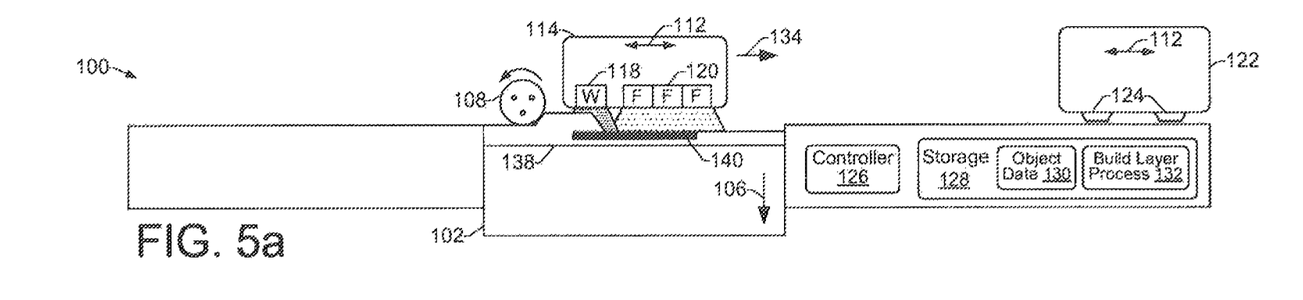
Figure 5B:
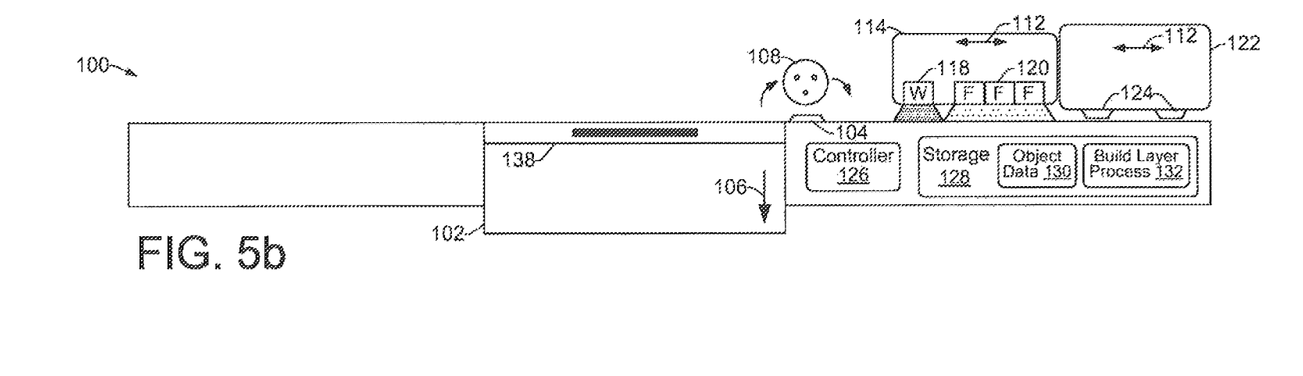

As shown in FIG. 1b, the first step in the multistep process proceeds with fusing lamps 120 traversing a previous layer of build powder that has been applied as an insulating layer 138. In this instance (i.e., the first instance of the first step of the multistep process), where there has not yet been a previous layer formed of the 3D part, the fusing lamps 120 may or may not apply fusing energy to the insulating layer 138. However, as shown in FIG. 5a, where a previous part layer has been formed, the first step in the multistep process proceeds with the fusing lamps 120 applying a fusing energy to the previously printed areas 140 of the build material. Following the application of fusing energy, the warming lamp 118 applies heat to the build layer to warm the build material. As the carriage moves across the print bed 102, the spreader spreads the pile of build material 104 over the previous layer to form a new layer of build material. As shown in FIG. 1c, at the end of the first step, or first carriage pass, in some examples where some build material remains in the pile of build material, the spreader roller 108 can be lifted up over the remaining pile of build material 104 and put down on the right side of the pile in preparation for spreading the remaining build material back over the print bed 102. Therefore, in a first step of the multistep process, a first pass of the carriage over the print bed 102 includes the operations of fusing, warming, and spreading of build material.

It should be noted that the order of these operations (i.e., fusing, warming, and spreading of build material) In the first step of the multistep process is influenced by the physical location of the lamps 118, 120, and the spreader 108 on the carriage 114, as well as the direction of motion of the carriage 114 across the print bed 102. With the carriage 114 moving from left to right across the print bed 102, the fusing lamp 120 encounters the print bed 102 first, followed by the warming lamp 118 and then the spreader 108. This general notion is true throughout the multistep process. In other examples, however, the physical locations of the lamps and spreader on the carriage 114 can be adjusted, causing a different order of operations.

Figure 2A:
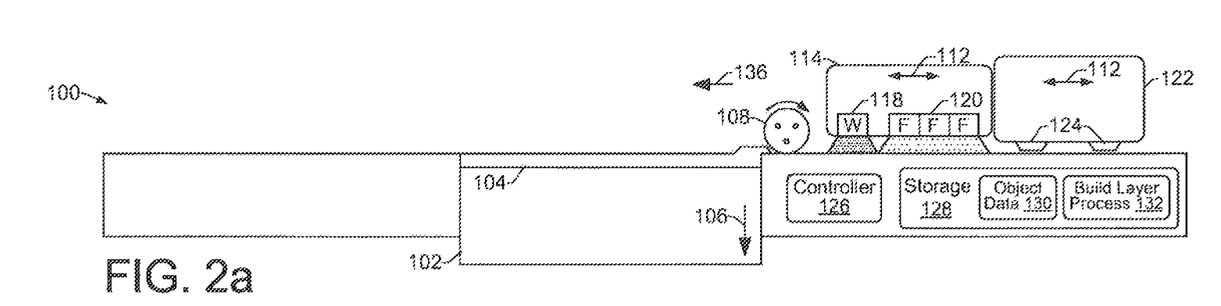
Figure 2B:
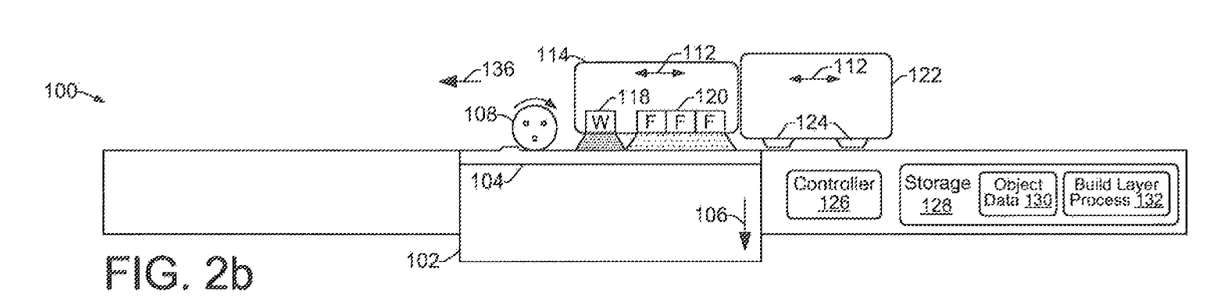
Figure 2C:
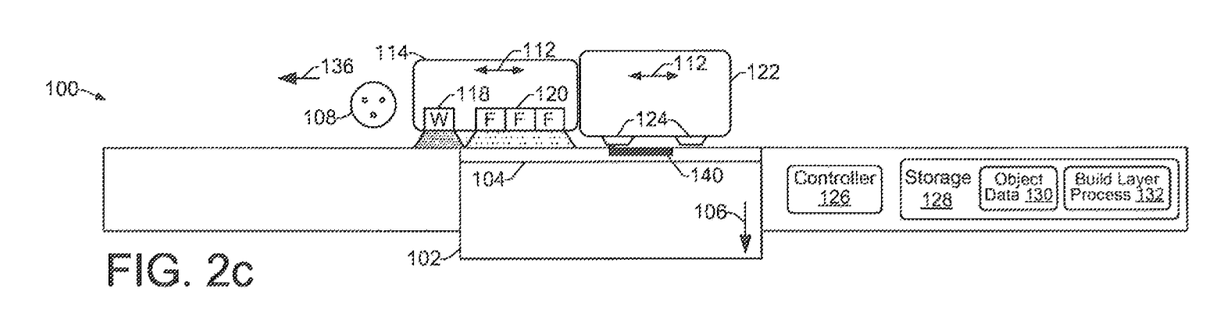

In FIG. 2 (i.e., FIGS. 2a, 2b, 2c) a second step in the multistep process is illustrated. In a second step, a second pass of carriages is made over the print bed 102. In the second pass, both the first carriage 114 and a second carriage 122 move over the print bed 102 in a second direction indicated by direction arrow 136, which is opposite the first direction. As shown in FIGS. 2a and 2b, the second carriage 122 begins from the right side of the print bed 102 and moves across the print bed 102 from right to left, in-line with and behind the first carriage 114. As shown in FIG. 6, both the first carriage 114 and second carriage 122 can be movably supported on the rail 116 to move in-line with one another as they make multiple passes across the print bed 102.

In the second step, or the second pass of carriages over the print bed 102 from right to left, the spreader 108 spreads the remaining pile of build material back over the print bed 102 as shown in FIGS. 2a and 2b. When the spreader 108 arrives on the left side of the print bed 102, it is lifted up to take it out of operation for the remainder of the multistep process. Following the spreader 108, are the warming lamp 118 and the fusing lamp 120 that warm the layer of build material 104 as they pass from right to left over the print bed 102. In some examples, because there has not yet been a liquid agent deposited onto the layer of build material, the fusing lamp 120 may or may not apply heating energy during the second pass over the print bed 102.

As the second carriage 122 follows the first carriage 114 from right to left across the print bed 102, the printhead 124 can deposit a liquid agent such as ink onto pre-selected locations of the build material as shown in FIG. 2c. The areas of printed build material 140 are to become fused portions of a 3D part according to object model data 130. During the second step of the multistep process, a second pass of carriages over the print bed 102 includes the multiple operations of spreading, warming, and printing the build material.

Figure 3A:
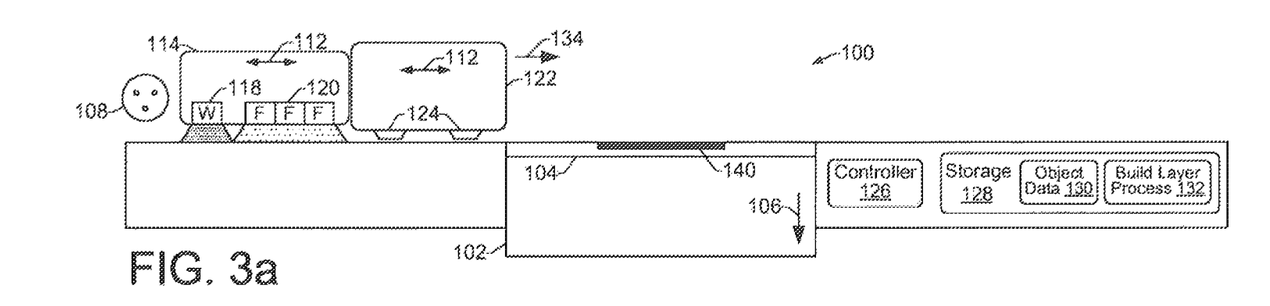
Figure 3B:
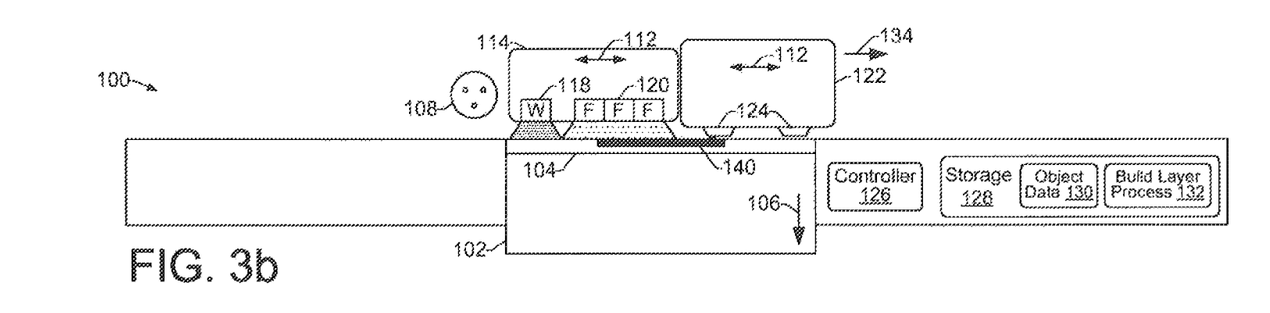
Figure 3C:
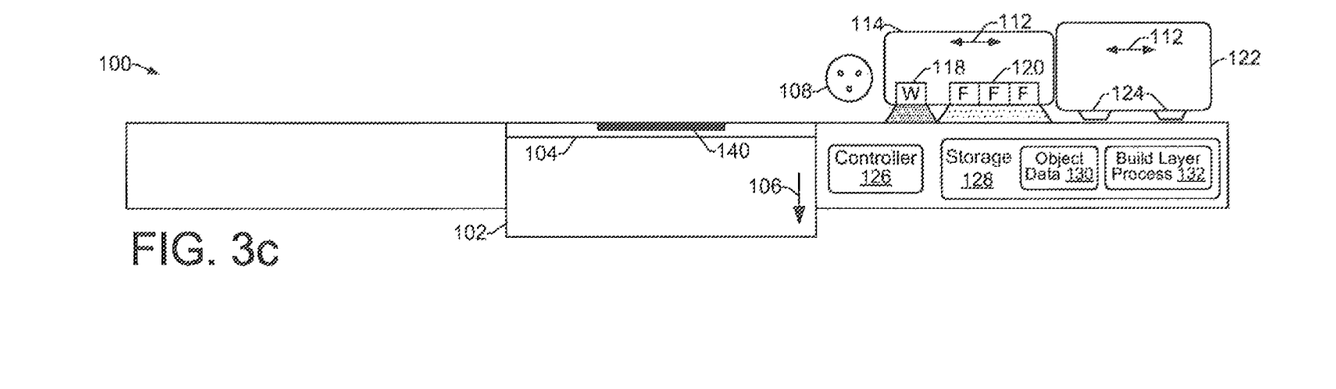

In FIG. 3 (i.e., FIGS. 3a, 3b, 3c) a third step in the multistep process is illustrated. In a third step, a third pass of carriages is made over the print bed 102. In the third pass, both the first carriage 114 and a second carriage 122 move again over the print bed 102 in a direction indicated by direction arrow 134. As shown in FIGS. 3a and 3b, the carriages 114 and 122 move across the print bed 102 from left to right, supported on a rail 116 (FIG. 6) in-line with one another and with the first carriage 114 behind the second carriage 122. As the second carriage 122 leads the first carriage 114 from left to right across the print bed 102, the printhead 124 can again deposit a liquid agent such as ink onto the pre-selected locations of the printed build material 140, as shown in FIG. 3b. As the first carriage 114 follows the second carriage 122 from left to right over the print bed 102, the fusing lamp 120 applies fusing energy to the printed build material 140 to fuse the areas of printed build material 140. The warming lamp 118 following the fusing lamp 120, then applies warming heat to warm the build material. Thus, during the third step of the multistep process, a third pass of carriages over the print bed 102 includes the multiple operations of printing, fusing, and warming the build material.

Figure 4A:
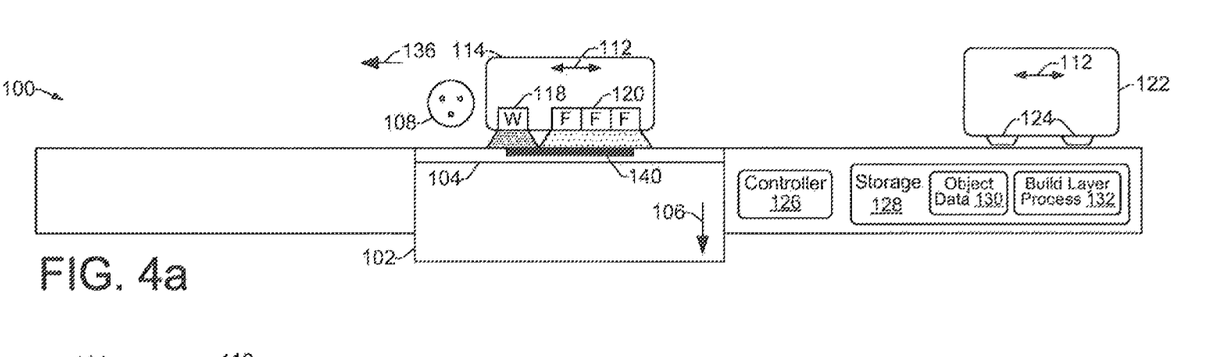
Figure 4B:
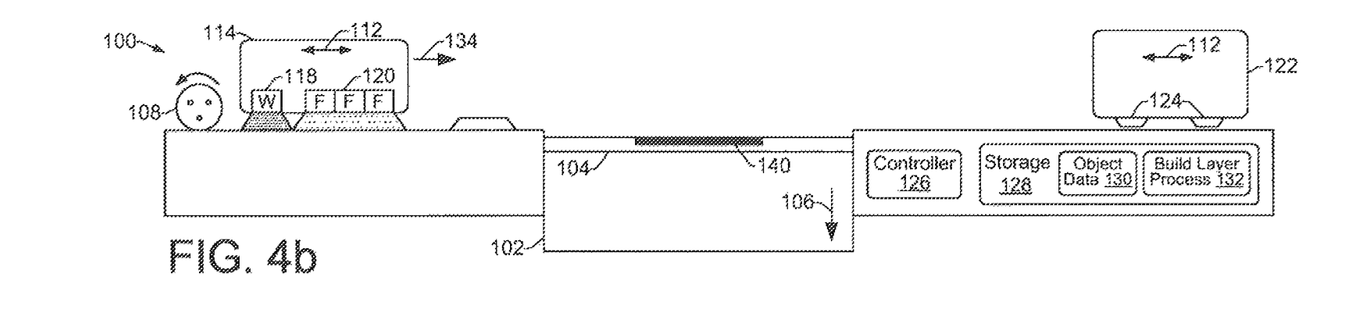

In FIG. 4 (i.e., FIGS. 4a, 4b) a fourth step in the multistep process is illustrated. In a fourth step, a fourth pass of carriages is made over the print bed 102. In the fourth pass, just the first carriage 114 moves again over the print bed 102 in a direction indicated by direction arrow 136. As shown in FIGS. 4a and 4b, the carriage 114 moves across the print bed 102 from right to left, supported on a rail 116 (FIG. 6). As the first carriage 114 moves across the print bed 102, the warming lamp 118 again applies warming heat to warm the build material, followed by the fusing lamp 120 that again applies fusing energy to the printed build material 140 to fuse the areas of printed build material 140. Thus, during the fourth step of the multistep process, a fourth pass of carriages over the print bed 102 includes the multiple operations of warming and fusing the build material. As noted above, FIGS. 5a and 5b illustrate a repeat of the first step of the multistep process where at least one layer of build material has been printed and fused.

As noted above, FIG. 7 shows a temperature profile graph 148 for PA12 build material over time through each step of the example multistep process just discussed above with reference to FIGS. 1-6. The FIG. 7 graph 148 includes two temperature profiles for the PA12 build material during the multistep process. The "3D part" temperature profile 150, also referred to as the part temperature profile 150, is the temperature profile of the printed portions of the layer of PA12 build material that is being fused or melted into the 3D part. The "powder" temperature profile 152, also referred to as the powder temperature profile 152, is the temperature profile of the unprinted portions of the layer of PA12 build material that do not become part of the 3D part, but instead surround the 3D part. In general, the unprinted portions of build material that remain unfused can be recovered and recycled.

The temperature profile shown in FIG. 7 illustrates how the multistep process of forming each layer of a 3D part as described herein, maintains the 3D part build material above the melting temperature for a sustained duration that extends through several of the process steps. At the same time the process maintains the surrounding powder build material within a neutral temperature zone to prevent the powder material from partial fusing and caking into hardened chunks that are difficult to recycle. The graph 148 of FIG. 7 shows three temperature zones, or temperature ranges for the example PA12 build material. The point where PA12 can begin melting is about 180° C., so a melt zone 154 for PA12 spans a temperature range from 180° C. and higher. The melt zone 154 shown in FIG. 7 spans a temperature from about 180° C. up to about 220° C. A neutral temperature zone 156 for PA12 build material spans a temperature range from about 153° C. up to about 180° C. In the neutral zone 156, PA12 build material that is not printed on with a liquid agent, is generally expected to avoid fusing and remain in a loose powder form for easy extraction from the 3D printer 100 and subsequent recycling. Because powder caking can begin to occur at around 170° C. to about 175° C., a target temperature 158 within the neutral zone 156 for the PA12 build material is about 162° C., as shown on the FIG. 7 graph. A crystallization zone 160 for the PA12 build material is below about 153° C. Melted build material that falls into the crystallization zone 160 too quickly and/or for too long a period of time can begin to crystallize, shrink, and warp, or otherwise change shape. Temperature profiles are maintained generally by passing a carriage comprising scanning heating lamps over the build material. The scanning time over one pass of the carriage over the build material can be on the order of 800 msec. The turn-around time for the carriage to reverse direction and pass back over the build material can be on the order of about 200 to about 900 msec. The time to complete a layer of PA12 build material in the described multistep process is on the order of about 5.3 seconds to about 6.5 seconds.

Referring still to the FIG. 7 graph of PA12 material temperature profile, the part profile 150 and the powder profile 152 can be observed as the multistep process for forming a layer of a 3D part progresses. As noted above, and as shown on the graph, in a first step of the multistep process, a first pass of the carriage over the print bed 102 includes the operations of fusing, warming, and spreading of build material. During the first pass beginning at 1.0 seconds, the part temperature profile 150 rises from about 181° C. to about 210° C. as the part is fused and warmed, and then it drops down to about 115° C. into the crystallization zone briefly when new powder is spread over the layer. Residual heat from the underlying material layer then begins to raise the temperature profile 150 between the first pass and the second pass, from about 1.4 seconds through about 2.7 seconds.

In a second step of the multistep process, the second pass of the carriages over the print bed 102 include the operations of spreading, warming, and printing the build material. During the second pass beginning at about 2.7 seconds, the part temperature profile 150 rises to about 180° C. and then drops back down to about 140° C. as the second pass operations are performed. Residual heat from the underlying material layer then begins to raise the temperature profile 150 between the second pass and the third pass, from about 3.2 seconds through about 4.1 seconds.

In a third step of the multistep process, a third pass of the carriages over the print bed 102 include the operations of printing, fusing, and warming the build material. During the third pass beginning at about 4.1 seconds, the part temperature profile 150 rises above 180° C., and then remains in the melt zone 154 through the third pass. The part temperature profile 150 is then maintained within the melt zone 154 between the third pass and the fourth pass from about 4.4 seconds to about 5.6 seconds.

In a fourth step of the multistep process, a fourth pass of the carriages over the print bed 102 include the operations of warming and fusing the build material. During the fourth pass beginning at about 5.6 seconds, the part temperature profile 150 remains in the melt zone 154 and rises to about 205° C. The part temperature profile 150 then remains in the melt zone 154 through the next pass, which is the first pass discussed above. Therefore, through three consecutive steps and carriage passes in the multistep process (i.e., passes 3, 4, and 1), the PA12 build material for the 3D part is maintained within the material melt zone for approximately 3.8 seconds (a duration of about 3.6 seconds to about 4.0 seconds). The increased time spent in the melt zone improves fusing between layers resulting in higher strength parts. The longer the 3d part is held within the melt zone, the more reptation occurs between layers. During these same three carriage passes, the white powder is maintained within the neutral zone 156 near the target temperature 158.

FIGS. 8, 9, and 10 are flow diagrams showing example methods 800, 900, and 1000, of forming a three-dimensional (3D) part. Methods 800, 900, and 1000 are associated with examples discussed above with regard to FIGS. 1-7, and details of the operations shown in methods 800, 900, and 1000 can be found in the related discussion of such examples. The operations of methods 800, 900, and 1000 may be embodied as programming instructions stored on a non-transitory, machine-readable (e.g., computer/processor-readable) medium, such as memory/storage 128 shown in FIGS. 1-5. In some examples, implementing the operations of methods 800, 900, and 1000 can be achieved by a controller, such as a controller 126 of FIGS. 1-5, reading and executing the programming instructions stored in a memory 128. In some examples, implementing the operations of methods 800, 900, and 1000 can be achieved using an ASIC and/or other hardware components alone or In combination with programming instructions executable by a controller 128.

The methods 800, 900, and 1000 may include more than one implementation, and different implementations of methods 800, 900, and 1000 may not employ every operation presented in the respective flow diagrams of FIGS. 8, 9, and 10. Therefore, while the operations of methods 800, 900, and 1000 are presented in a particular order within their respective flow diagrams, the order of their presentations is not intended to be a limitation as to the order in which the operations may actually be implemented, or as to whether all of the operations may be implemented. For example, one implementation of method 800 might be achieved through the performance of a number of initial operations, without performing other subsequent operations, while another implementation of method 800 might be achieved through the performance of all of the operations.

Referring now to the flow diagram of FIG. 8, an example method 800 of forming a 3D part begins at block 802 with spreading a layer of build material over a print bed. The method can continue at block 804 with heating the layer of build material during each of consecutive passes of a scanning heating lamp on a carriage over the print bed to maintain printed portions of build material above a melting temperature for the duration of the consecutive passes. In some examples, as shown at block 806, spreading a layer of build material comprises bi-directionally spreading the layer of build material over the print bed during two of the consecutive carriage passes. As shown at block 808, the method can include bi-directionally printing a liquid agent onto the build material to form the printed portions of build material during two of the consecutive carriage passes. In some examples, as shown at block 810, spreading a layer of build material and heating the layer of build material comprises passing a first carriage comprising a spreader bi-directionally over the print bed, and printing a liquid fusing agent onto the build material comprises passing a second carriage comprising a liquid dispenser bi-directionally over the print bed. In some examples, passing the first and second carriages comprises passing the carriages in-line with one another along a common support, as shown at block 812. In some examples, spreading a layer of build material and heating the layer of build material comprises transporting a material spreader and multiple heating sources on a single carriage back and forth over the print bed, as shown at block 814. In some examples, heating the layer of build material during each of multiple consecutive carriage passes comprises maintaining unprinted portions of the build material at a neutral temperature below a melting temperature, as shown at block 816.

In some examples, the build material comprises PA12 build material, as shown at block 818. Maintaining printed portions of the PA12 build material above a melting temperature comprises maintaining printed portions of the build material above about 180° C. In addition, as shown at block 820, maintaining printed portions of the PA12 build material above a melting temperature for the duration of the consecutive carriage passes comprises maintaining printed portions of the build material above a melting temperature for a duration of about 3.6 seconds to about 4.0 seconds.

Referring now to the flow diagram of FIG. 9, an example method 900 of forming a 3D part begins at block 902 with passing a first carriage comprising a spreader over a print bed multiple times to spread a new layer of build material over the print bed. The method also includes passing a second carriage comprising a liquid dispenser over the print bed multiple times to selectively print a liquid fusing agent onto the build material, as shown at block 904. While passing the first carriage over the print bed multiple times, a fusing energy and warming energy are applied from scanning lamps on the first carriage to maintain the printed build material above a melting temperature while maintaining unprinted build material in a neutral temperature zone, below a caking onset temperature and above a crystallization onset temperature, as shown at block 906. In some examples, as shown at block 908, passing the first carriage over the print bed multiple times comprises, in a first pass, fusing and warming a previous layer of build material, and spreading a pile of build material to form a new layer of build material; in a second pass, spreading a remainder of the pile over the new layer of build material, and warming the new layer of build powder; in a third pass, fusing printed areas of the new layer of build powder, and warming the new layer of build powder; and in a fourth pass, warming the new layer of build powder, and fusing printed areas of the new layer of build powder.

As shown at block 910, the method 900 can include selectively printing a liquid agent onto the new layer of build material during second and third carriage passes. In some examples, as shown at block 912, spreading a remainder of the pile of build material comprises lifting a spreader from one side of the pile of build material to another side of the pile of build material to spread the build material in an opposite direction over the print bed. In some examples, as shown at block 914, the build material comprises PA12, and maintaining the printed build material above a melting temperature comprises maintaining the printed build material in a temperature range from about 180° C. to about 220° C., and, maintaining the unprinted build material in a neutral temperature zone comprises maintaining the unprinted build material in a temperature range from about 153° C. to about 180° C.

Referring now to the flow diagram of FIG. 10, an example method 1000 of forming a 3D part begins at block 1002 with, in a first pass, passing a first carriage comprising fusing and warming lamps and a spreader over a print bed to fuse and warm a previous layer of build material and to spread a pile of build material to form a new layer of build material over the previous layer of build material. The method continues at block 1004 with, in a second pass, passing the first carriage and a second carriage comprising a liquid dispenser over the print bed in-line with one another to spread a remainder of the pile of build material over the new layer, warm the new layer, and print a liquid fusing agent onto the new layer. As shown at block 1006, the method can include in a third pass, passing the first and second carriages over the print bed in-line with one another to print a liquid agent onto the new layer, fuse the printed areas of the new layer, and warm the new layer. As shown at block 1008, the method can further include in a fourth pass, passing the first carriage over the print bed to warm the new layer and to fuse the printed areas of the new layer.

What is claimed is:

1. A method of forming a three-dimensional (3D) part comprising:
    during a first pass of a carriage over a print bed, heating printed portions of a layer of build material above a melting temperature with a fusing lamp on the carriage having a first wavelength, and heating unprinted portions of the layer to a neutral temperature below a caking onset temperature and above a crystallization onset temperature with a warming lamp on the carriage having a second wavelength; and,
    during each of a plurality of subsequent consecutive carriage passes over the print bed, maintaining the printed portions of the layer of build material above the melting temperature with the fusing lamp for the duration of the consecutive carriage passes.

2. A method as in claim 1, further comprising bi-directionally spreading a layer of build material over the print bed during two of the consecutive carriage passes.

3. A method as in claim 1, further comprising:
    during two of the consecutive carriage passes, bi-directionally printing a liquid fusing agent onto the build material to form the printed portions of build material.

4. A method as in claim 3, wherein:
    spreading a layer of build material and heating the layer of build material comprises passing a first carriage comprising a spreader bi-directionally over the print bed; and,
    printing a liquid fusing agent onto the build material comprises passing a second carriage comprising a liquid dispenser bi-directionally over the print bed.

5. A method as in claim 4, wherein passing the first and second carriages comprises passing the carriages in-line with one another along a common support.

6. A method as in claim 2, wherein spreading a layer of build material and heating the layer of build material comprises transporting a material spreader and multiple heating sources on a single carriage back and forth over the print bed.

7. A method as in claim 1, wherein maintaining the printed portions of the layer of build material above the melting temperature comprises maintaining unprinted portions of the build material at a neutral temperature below a melting temperature.

8. A method as in claim 1, wherein the build material comprises PA12 build material, and wherein maintaining printed portions of the build material above a melting temperature comprises maintaining printed portions of the build material above about 180° C.

9. A method as in claim 8, wherein maintaining printed portions of the build material above a melting temperature for the duration of the consecutive carriage passes comprises maintaining printed portions of the build material above a melting temperature for a duration of about 3.6 seconds to about 4.0 seconds.

10. A method of forming a three-dimensional (3D) part comprising:
    passing a first carriage comprising a spreader over a print bed multiple times to spread a new layer of build material over the print bed;
    passing a second carriage comprising a liquid dispenser over the print bed multiple times to selectively print a liquid fusing agent onto the build material; and,
    while passing the first carriage over the print bed multiple times and applying fusing energy and warming energy from scanning lamps on the first carriage, maintaining the printed build material above a melting temperature while maintaining unprinted build material in a neutral temperature zone, below a caking onset temperature and above a crystallization onset temperature.

11. A method as in claim 10, wherein passing the first carriage over the print bed multiple times comprises:
    in a first pass, fusing and warming a previous layer of build material, and spreading a pile of build material to form a new layer of build material;
    in a second pass, spreading a remainder of the pile over the new layer of build material, and warming the new layer of build powder;
    in a third pass, fusing printed areas of the new layer of build powder, and warming the new layer of build powder; and,
    in a fourth pass, warming the new layer of build powder, and fusing printed areas of the new layer of build powder.

12. A method as in claim 11, wherein passing the second carriage over the print bed multiple times comprises:
    during second and third carriage passes, selectively printing a liquid agent onto the new layer of build material.

13. A method as in claim 11, wherein spreading a remainder of the pile of build material comprises lifting a spreader from one side of the pile of build material to another side of the pile of build material to spread the build material in an opposite direction over the print bed.

14. A method as in claim 10, wherein the build material comprises PA12, and wherein:
    maintaining the printed build material above a melting temperature comprises maintaining the printed build material in a temperature range from about 180° C. to about 220° C.; and,
    maintaining the unprinted build material in a neutral temperature zone comprises maintaining the unprinted build material in a temperature range from about 153° C. to about 180° C.

15. A method of forming a three-dimensional (3D) part comprising:
    in a first pass, passing a first carriage comprising fusing and warming lamps and a spreader over a print bed to fuse and warm a previous layer of build material and to spread a pile of build material to form a new layer of build material over the previous layer of build material;
    in a second pass, passing the first carriage and a second carriage comprising a liquid dispenser over the print bed in-line with one another to spread a remainder of the pile of build material over the new layer, warm the new layer, and print a liquid fusing agent onto the new layer;
    in a third pass, passing the first and second carriages over the print bed in-line with one another to print a liquid agent onto the new layer, fuse the printed areas of the new layer, and warm the new layer; and,
    in a fourth pass, passing the first carriage over the print bed to warm the new layer and to fuse the printed areas of the new layer.

* * * * *